(12) United States Patent
Sudou

(10) Patent No.: US 11,535,374 B2
(45) Date of Patent: Dec. 27, 2022

(54) MANAGEMENT SYSTEM OF WORK SITE AND MANAGEMENT METHOD OF WORK SITE

(71) Applicant: Komatsu Ltd., Tokyo (JP)

(72) Inventor: Tsugio Sudou, Tokyo (JP)

(73) Assignee: Komatsu Ltd., Tokyo (JP)

( * ) Notice: Subject to any disclaimer, the term of this patent is extended or adjusted under 35 U.S.C. 154(b) by 456 days.

(21) Appl. No.: 16/611,305

(22) PCT Filed: Nov. 29, 2018

(86) PCT No.: PCT/JP2018/044060
§ 371 (c)(1),
(2) Date: Nov. 6, 2019

(87) PCT Pub. No.: WO2019/130973
PCT Pub. Date: Jul. 4, 2019

(65) Prior Publication Data
US 2020/0164980 A1     May 28, 2020

(30) Foreign Application Priority Data

Dec. 27, 2017 (JP) .............................. JP2017-252645

(51) Int. Cl.
*B64C 39/02* (2006.01)
*G05D 1/00* (2006.01)
(Continued)

(52) U.S. Cl.
CPC .......... *B64C 39/024* (2013.01); *G05D 1/0011* (2013.01); *G05D 1/0094* (2013.01);
(Continued)

(58) Field of Classification Search
CPC . B64C 39/024; B64C 13/20; B64C 2201/123; B64C 2201/127; G05D 1/0011;
(Continued)

(56) References Cited

U.S. PATENT DOCUMENTS 9,505,494 B1 * 11/2016 Marlow ................ B64C 39/024
2007/0235584 A1 * 10/2007 Corman ................ H04L 67/125
244/75.1
(Continued)

FOREIGN PATENT DOCUMENTS

JP     2008-184979 A     8/2008
JP     2016-171441 A     9/2016
(Continued)

OTHER PUBLICATIONS

International Search Report dated Jan. 29, 2019, issued for PCT/JP2018/044060.
(Continued)

*Primary Examiner* — Tyler D Paige
(74) *Attorney, Agent, or Firm* — Locke Lord LLP

(57) ABSTRACT

A management system of a work site includes an image data acquisition unit that acquires image data of an unmanned vehicle stopped at the work site due to generation of a trouble, the image data being imaged by an imaging device mounted in a movable body.

8 Claims, 12 Drawing Sheets

(51) Int. Cl.
 *G05D 1/10* (2006.01)
 *G07C 5/00* (2006.01)
 *G07C 5/08* (2006.01)
(52) U.S. Cl.
 CPC ........ *G05D 1/101* (2013.01); *B64C 2201/127* (2013.01); *G07C 5/006* (2013.01); *G07C 5/008* (2013.01); *G07C 5/0866* (2013.01)
(58) Field of Classification Search
 CPC ...... G05D 1/0094; G05D 1/101; G07C 5/006; G07C 5/008; G07C 5/0866
 USPC .......................................................... 701/3
 See application file for complete search history.

(56) References Cited

U.S. PATENT DOCUMENTS

| | | |
|---|---|---|
| 2015/0105933 A1 | 4/2015 | Martin et al. |
| 2016/0236638 A1 | 8/2016 | Lavie et al. |
| 2016/0363932 A1* | 12/2016 | Moriarity ............ G05D 1/0094 |

FOREIGN PATENT DOCUMENTS

| | | | |
|---|---|---|---|
| WO | 2016/123424 A1 | 8/2016 | |
| WO | WO-2016123424 A1 * | 8/2016 | ........... B64C 39/024 |
| WO | 2017/122278 A1 | 7/2017 | |
| WO | WO-2017143588 A1 * | 8/2017 | ........... B64C 39/024 |

OTHER PUBLICATIONS

Office Action dated Jun. 18, 2020, issue in the corresponding AU patent application No. 2018394476.

* cited by examiner

MANAGEMENT SYSTEM OF WORK SITE AND MANAGEMENT METHOD OF WORK SITE

FIELD

The present invention relates to a management system of a work site, and a management method of a work site.

BACKGROUND

There is a case where an unmanned vehicle is used at a wide work site such as a mine or a quarry (see Patent Literature 1).

CITATION LIST

Patent Literature

Patent Literature 1: Japanese Patent Application Laid-Open No. 2008-184979

SUMMARY

Technical Problem

In a case where a trouble is generated in a traveling unmanned vehicle and the unmanned vehicle is stopped, when a state in which the unmanned vehicle is stopped is left, productivity at a work site is decreased. When a trouble is generated in the unmanned vehicle and the unmanned vehicle is stopped, it is necessary to promptly check a condition of the unmanned vehicle and to take a measure in order to control a decrease in productivity at the work site.

An aspect of the present invention is to control a decrease in productivity at a work site where an unmanned vehicle is operated.

Solution to Problem

According to an aspect of the present invention, a management system of a work site, comprises: an image data acquisition unit that acquires image data of an unmanned vehicle stopped at the work site due to generation of a trouble, the image data being imaged by an imaging device mounted in a movable body.

Advantageous Effects of Invention

According to an aspect of the present invention, it is possible to control a decrease in productivity at a work site where an unmanned vehicle is operated.

DESCRIPTION OF EMBODIMENTS

In the following, embodiments according to the present invention will be described with reference to the drawings. However, the present invention is not limited to these. Configuration elements of the embodiments described in the following can be arbitrarily combined. Also, there is a case where a part of the configuration elements is not used.

[Management System]

Figure 1:
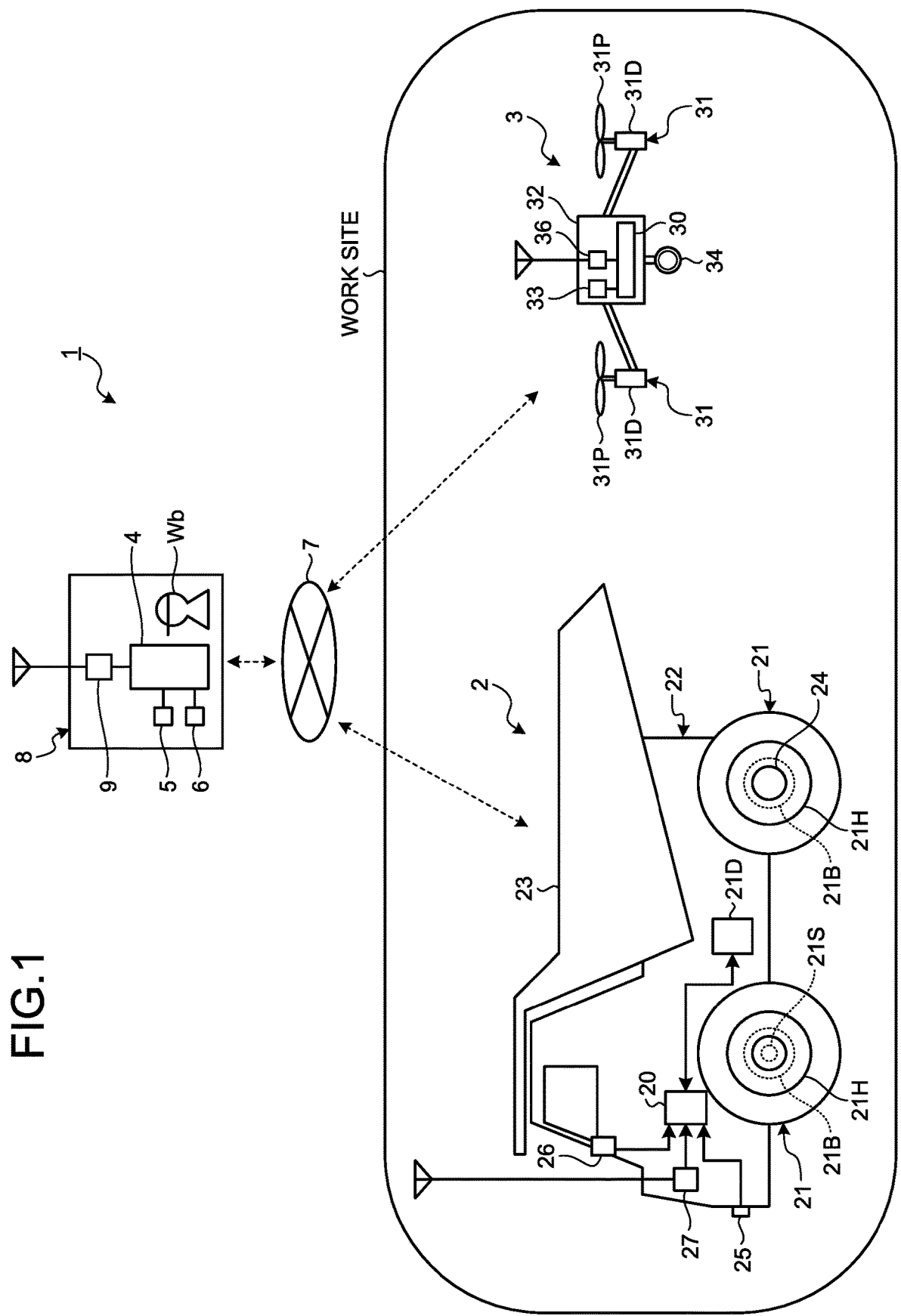
FIG. 1 is a view schematically illustrating an example of a management system of a work site according to the present embodiment.

FIG. 1 is a view schematically illustrating an example of a management system 1 at a work site according to the present embodiment. As illustrated in FIG. 1, an unmanned vehicle 2 and a flight vehicle 3 are operated at a work site.

The unmanned vehicle 2 means a vehicle that travels in an unmanned manner without depending on driving operation by a driver. The unmanned vehicle 2 travels on the basis of target traveling data described later. Note that the unmanned vehicle 2 may be made to travel by remote operation or may travel autonomously. The flight vehicle 3 is an unmanned aircraft that flies in an unmanned manner. The flight vehicle 3 may be made to fly by remote operation or may fly autonomously. In the following description, the flight vehicle 3 is arbitrarily referred to as a drone 3.

The work site is a mine or a quarry. The unmanned vehicle 2 is a dump truck that travels at the work site and that transports a cargo. The drone 3 can fly at the work site. Each of the unmanned vehicle 2 and the drone 3 is a movable body that can move at the work site. The mine means a place or a plant where a mineral is mined. The quarry means a place or a plant where a rock is mined. As a cargo to be transported by the unmanned vehicle 2, ore or dirt mined in the mine or the quarry is exemplified.

A management system 1 includes a management device 4, an input device 5, an output device 6, and a communication system 7. The management device 4, the input device 5, and the output device 6 are installed in a control facility 8 at the work site. The communication system 7 performs communication between the management device 4, the unmanned vehicle 2, and the drone 3. A wireless communication machine 9 is connected to the management device 4. The communication system 7 includes the wireless communication machine 9. The management device 4, the unmanned vehicle 2, and the drone 3 perform wireless communication through the communication system 7. The unmanned vehicle 2 travels at the work site on the basis of target traveling data from the management device 4.

The input device 5 is operated by a controller Wb in the control facility 8. The input device 5 generates input data by being operated by the controller Wb. The input data generated by the input device 5 is output to the management device 4. As the input device 5, at least one of a keyboard for a computer, a button, a switch, and a touch panel is exemplified.

The output device 6 is controlled by the management device 4 and outputs prescribed output data. As the output device 6, at least one of a display device that can display display data, a sound output device that can output sound, and a printing device that can output a print is exemplified. In the present embodiment, it is assumed that the output device 6 includes a display device. In the following description, the output device 6 is arbitrarily referred to as a display device 6.

The display device 6 includes a flat panel display such as a liquid crystal display (LCD) or an organic electroluminescence display (OELD). The controller Wb can see a display screen of the display device 6.

[Unmanned Vehicle]

The unmanned vehicle 2 can travel at the work site. The unmanned vehicle 2 includes a control device 20, a traveling device 21, a vehicle main body 22 supported by the traveling device 21, a dump body 23 supported by the vehicle main body 22, a vehicle speed sensor 24 that detects a traveling speed of the unmanned vehicle 2, a non-contact sensor 25 that contactlessly detects an object, a position sensor 26 that detects a position of the unmanned vehicle 2, and a wireless communication machine 27.

The traveling device 21 includes a drive device 21D, a brake device 21B, a steering device 21S, and a wheel 21H. The unmanned vehicle 2 travels autonomously by a rotation of the wheel 21H. The wheel 21H includes a front wheel and a rear wheel. A tire is attached to the wheel 21H.

The drive device 21D generates a driving force to accelerate the unmanned vehicle 2. The drive device 21D includes at least one of an internal-combustion engine such as a diesel engine, and an electric motor. The driving force generated in the drive device 21D is transmitted to the wheel 21H (rear wheel). The brake device 21B generates a braking force to decelerate or stop the unmanned vehicle 2. The steering device 21S generates a steering force to adjust a traveling direction of the unmanned vehicle 2. The steering force generated in the steering device 21S is transmitted to the wheel 21H (front wheel).

The control device 20 outputs an operation command to the traveling device 21. The operation command includes at least one of an accelerator command to activate the drive device 21D to accelerate the unmanned vehicle 2, a brake command to activate the brake device 21B to decelerate or stop the unmanned vehicle 2, and a steering command to activate the steering device 21S to adjust a traveling direction of the unmanned vehicle 2. The drive device 21D generates a driving force to accelerate the unmanned vehicle 2 on the basis of the accelerator command output from the control device 20. The brake device 21B generates a braking force to decelerate or stop the unmanned vehicle 2 on the basis of the brake command output from the control device 20. The steering device 21S generates a steering force to make the unmanned vehicle 2 move straight or turn on the basis of the steering command output from the control device 20.

The vehicle speed sensor 24 detects a traveling speed of the unmanned vehicle 2. For example, the vehicle speed sensor 24 detects a rotation speed of the wheel 21H, and detects a traveling speed of the unmanned vehicle 2.

The non-contact sensor 25 contactlessly detects an object around the unmanned vehicle 2. The object includes an obstacle that prevents traveling of the unmanned vehicle 2. The non-contact sensor 25 is provided in a front part of the vehicle main body 22. Note that the non-contact sensor 25 may be provided in a side part of the vehicle main body 22. The non-contact sensor 25 includes a laser scanner device. The non-contact sensor 25 detects an object contactlessly with a laser beam that is detection light. The non-contact sensor 25 can detect existence/non-existence of an object, a relative position with respect to the object, and a relative speed with respect to the object. Note that the non-contact sensor 25 may include a radar device such as a millimeter-wave radar device. The radar device can detect an object contactlessly with a radio wave.

The position sensor 26 detects a position of the unmanned vehicle 2. The position sensor 26 detects a position of the unmanned vehicle 2 by using a global navigation satellite system (GNSS). The global navigation satellite system includes a global positioning system (GPS). The global navigation satellite system detects an absolute position of the unmanned vehicle 2 which position is prescribed by coordinate data of latitude, longitude, and altitude. With the global navigation satellite system, a position of the unmanned vehicle 2 which position is prescribed in a global coordinate system is detected. The global coordinate system is a coordinate system fixed to the earth. The position sensor 26 includes a GPS receiver, and detects an absolute position (coordinate) of the unmanned vehicle 2.

The wireless communication machine 27 can communicate with the management device 4 wirelessly. The communication system 7 includes the wireless communication machine 27.

[Drone]

The drone 3 can fly at the work site. The drone 3 includes a control device 30, a flight device 31, a main body 32 supported by the flight device 31, a position sensor 33 that detects a position of the drone 3, an imaging device 34, and a wireless communication machine 36.

The flight device 31 includes a propeller 31P, and a drive device 31D. The drive device 31D generates a driving force to rotate the propeller 31P. The drive device 31D includes an electric motor. The drone 3 has a power supply that supplies electric power to the electric motor. The power supply includes a rechargeable battery. The main body 32 is supported by the flight device 31. The drone 3 flies by a rotation of the propeller 31P.

The position sensor 33 detects a position of the drone 3. The position sensor 33 includes a GPS receiver and detects an absolute position (coordinate) of the drone 3.

The imaging device 34 acquires image data of a subject. The imaging device 34 includes an optical system and an image sensor. The image sensor includes a couple charged device (CCD) image sensor or a complementary metal oxide semiconductor (CMOS) image sensor.

The wireless communication machine 36 can communicate with the management device 4, and the control device 20 of the unmanned vehicle 2 wirelessly. The communication system 7 includes the wireless communication machine 36.

[Outline of Processing]

Figure 2:
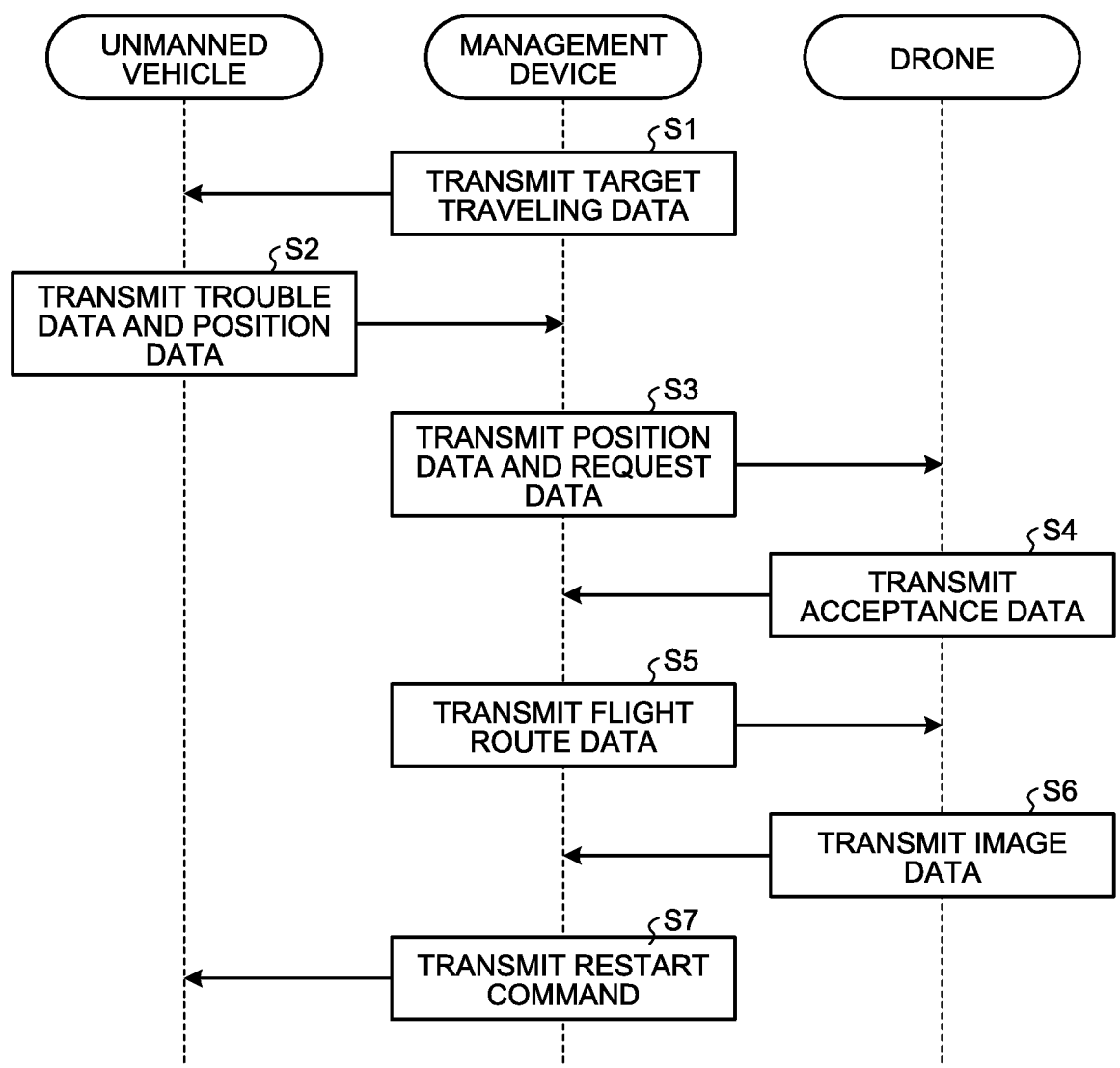
FIG. 2 is a sequence diagram illustrating processing of the management system according to the present embodiment.

FIG. 2 is a sequence diagram illustrating an outline of processing of the management system 1 according to the present embodiment. The management device 4 generates target traveling data indicating a target traveling condition of the unmanned vehicle 2. The management device 4 transmits the target traveling data to the unmanned vehicle 2 through the communication system 7 (step S1).

The target traveling condition of the unmanned vehicle 2 means a target condition of a traveling state requested to the unmanned vehicle 2 by the management system 1. The target traveling condition of the unmanned vehicle 2 includes a target traveling speed, target acceleration, and a target traveling course of the unmanned vehicle 2. For example, the target traveling condition is prescribed in the global coordinate system.

The unmanned vehicle 2 receives the target traveling data. The unmanned vehicle 2 travels according to the target traveling data.

When a trouble is generated in the traveling unmanned vehicle 2, the unmanned vehicle 2 is stopped. The unmanned vehicle 2 transmits trouble data indicating that the trouble is generated and position data of the unmanned vehicle 2 stopped due to generation of the trouble to the management device 4 through the communication system 7 (step S2).

The management device 4 receives the trouble data and the position data from the unmanned vehicle 2. The management device 4 starts processing of guiding the drone 3 to the unmanned vehicle 2 stopped due to generation of the trouble. The management device 4 transmits the position data of the stopped unmanned vehicle 2 and request data requesting a flight toward the unmanned vehicle 2 to the drone 3 through the communication system 7 (step S3).

The drone 3 receives the position data of the stopped unmanned vehicle 2 and the request data. In a case where the control device 30 of the drone 3 accepts the flight toward the unmanned vehicle 2, acceptance data to accept the flight toward the unmanned vehicle 2 is generated. The drone 3 transmits the acceptance data to the management device 4 through the communication system 7 (step S4).

The management device 4 receives the acceptance data. Through the communication system 7, the management device 4 transmits flight route data indicating a flight route to the stopped unmanned vehicle 2 to the drone 3 that outputs the acceptance data (step S5).

The drone 3 receives the flight route data. On the basis of the flight route data, the drone 3 that receives the flight route data flies toward the unmanned vehicle 2 in which the trouble is generated. The drone 3 that arrives at the unmanned vehicle 2 checks a condition of the unmanned vehicle 2. The condition of the unmanned vehicle 2 includes a condition around the unmanned vehicle 2. The drone 3 acquires image data of the unmanned vehicle 2 from the above with the imaging device 34. The image data of the unmanned vehicle 2 includes image data of at least a front side of the vehicle around the unmanned vehicle 2. The drone 3 transmits the image data of the unmanned vehicle 2 to the management device 4 through the communication system 7 (step S6).

Note that when the drone 3 arrives at the unmanned vehicle 2 stopped due to generation of the trouble, the control device 30 may transmit arrival data indicating that the drone 3 arrives at the unmanned vehicle 2 to the management device 4 through the communication system 7 on the basis of detection data of the position sensor 33.

The management device 4 receives the image data of the unmanned vehicle 2. On the basis of the image data, the management device 4 determines whether the unmanned vehicle 2 is in a state of being able to travel based on the target traveling data. Note that the controller Wb may determine whether the unmanned vehicle 2 is in the state of being able to travel based on the target traveling data. In a case of determining that the unmanned vehicle 2 can resume traveling, the management device 4 transmits a restart command, which causes traveling based on the target traveling data, to the stopped unmanned vehicle 2 through the communication system 7 (step S7). Accordingly, the unmanned vehicle 2 travels based on the target traveling data.

[Control Device]

Figure 3:
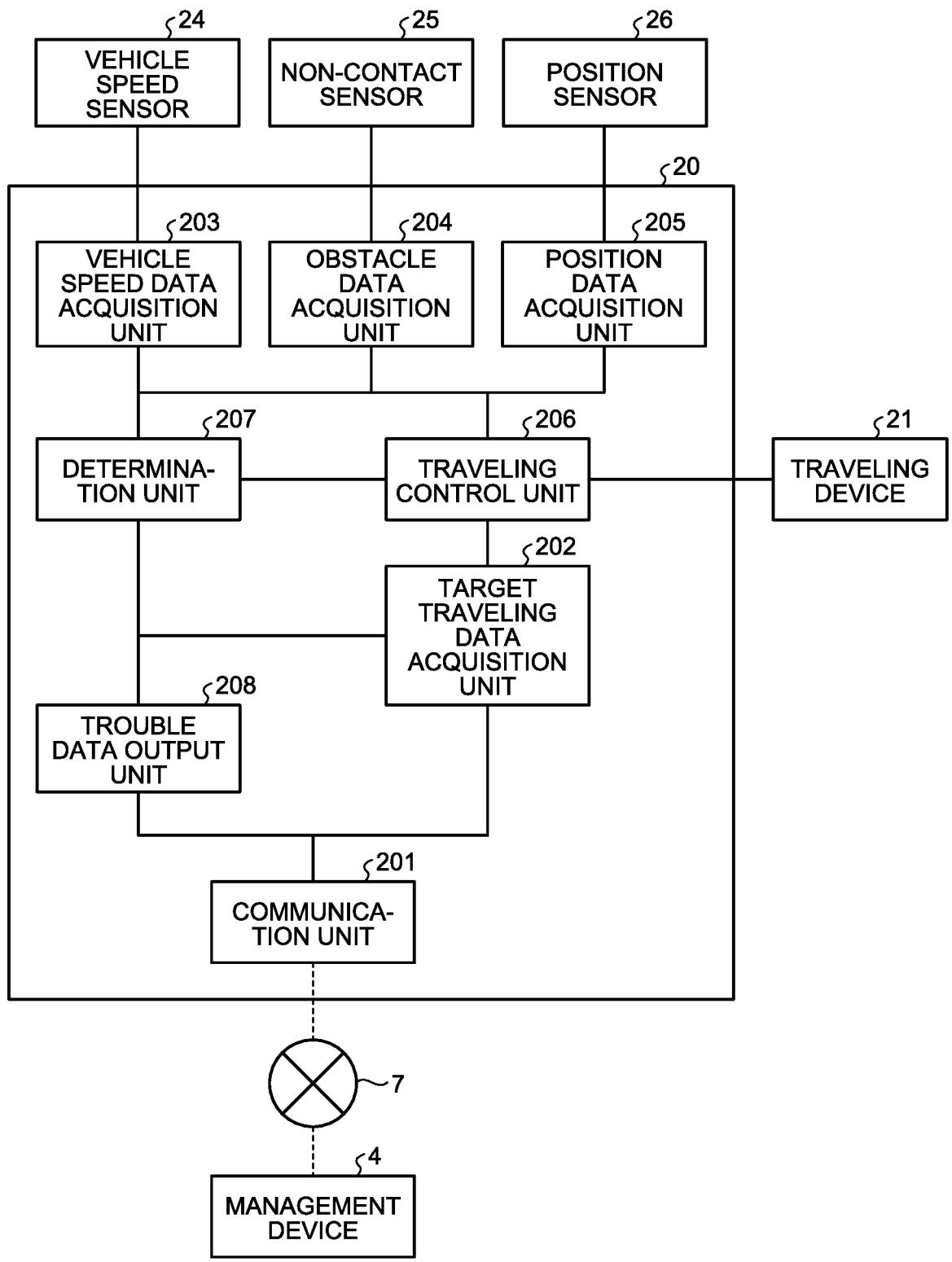
FIG. 3 is a functional block diagram illustrating a control device according to the present embodiment.

FIG. 3 is a functional block diagram illustrating the control device 20 according to the present embodiment. The control device 20 includes a computer system. The control device 20 communicates with the management device 4 wirelessly through the communication system 7.

The control device 20 includes a communication unit 201, a target traveling data acquisition unit 202, a vehicle speed data acquisition unit 203, an obstacle data acquisition unit 204, a position data acquisition unit 205, a traveling control unit 206, a determination unit 207, and a trouble data output unit 208.

The communication unit 201 receives data or a signal transmitted from the management device 4 through the communication system 7. Also, the communication unit 201 transmits data or a signal to the management device 4 through the communication system 7.

The target traveling data acquisition unit 202 acquires target traveling data of the unmanned vehicle 2 from the management device 4.

The vehicle speed data acquisition unit 203 acquires vehicle speed data indicating a traveling speed of the unmanned vehicle 2 from the vehicle speed sensor 24.

From the non-contact sensor 25, the obstacle data acquisition unit 204 acquires obstacle data indicating at least one of existence/non-existence of an obstacle around the unmanned vehicle 2, a relative position with respect to the obstacle, and a relative speed with respect to the obstacle.

The position data acquisition unit 205 acquires position data indicating an absolute position of the unmanned vehicle 2 from the position sensor 26.

The traveling control unit 206 controls the traveling device 21 on the basis of the target traveling data acquired by the target traveling data acquisition unit 202. The traveling control unit 206 outputs an operation command including an accelerator command to activate the drive device 21D, a brake command to activate the brake device 21B, and a steering command to activate the steering device 21S to the traveling device 21 in such a manner that the unmanned vehicle 2 travels according to the target traveling data.

The determination unit 207 determines whether a trouble is generated in the unmanned vehicle 2. The determination unit 207 determines whether the trouble is generated in the unmanned vehicle 2 on the basis of at least one of the vehicle speed data acquired by the vehicle speed data acquisition unit 203, the obstacle data acquired by the obstacle data acquisition unit 204, and the position data acquired by the position data acquisition unit 205.

The trouble of the unmanned vehicle 2 includes both of a trouble in a traveling state of the unmanned vehicle 2, and a cause of generating a trouble in the traveling state of the unmanned vehicle 2.

The trouble in the traveling state of the unmanned vehicle 2 includes a state in which the unmanned vehicle 2 is traveling in a traveling condition different from a target traveling condition prescribed by the target traveling data.

The trouble in the traveling state of the unmanned vehicle 2 includes a state in which the unmanned vehicle 2 is stopped. For example, when the non-contact sensor 25 detects an obstacle, the traveling control unit 206 stops the unmanned vehicle 2 on the basis of the obstacle data acquired by the obstacle data acquisition unit 204 in order to avoid a contact between the unmanned vehicle 2 and the obstacle. Also, when the unmanned vehicle 2 is deviated from the target traveling course, the traveling control unit 206 stops the unmanned vehicle 2 on the basis of the position data of the unmanned vehicle 2 which data is acquired by the position data acquisition unit 205. Note that as a cause of the deviation of the unmanned vehicle 2 from the target traveling course, slipping of the unmanned vehicle 2 by a muddy traveling road due to rainwater or watering is exemplified, for example.

Also, the trouble in the traveling state of the unmanned vehicle 2 includes a state in which the unmanned vehicle 2 travels at a traveling speed lower than the target traveling speed. For example, when the non-contact sensor 25 detects an obstacle, the traveling control unit 206 may decelerate the unmanned vehicle 2 on the basis of the obstacle data acquired by the obstacle data acquisition unit 204. Also, when the unmanned vehicle 2 is deviated from the target traveling course, the traveling control unit 206 may decelerate the unmanned vehicle 2 on the basis of the position data of the unmanned vehicle 2 which data is acquired by the position data acquisition unit 205.

That is, the trouble in the traveling state of the unmanned vehicle 2 includes a trouble in a traveling speed of the unmanned vehicle 2. In a case where the unmanned vehicle 2 is stopped or traveling at a traveling speed lower than a target traveling speed although the target traveling speed is designated based on the target traveling data acquired by the target traveling data acquisition unit 202 and the vehicle speed data acquired by the vehicle speed data acquisition unit 203, the determination unit 207 determines that a trouble is generated in the traveling speed.

The cause of generating a trouble in a traveling state of the unmanned vehicle 2 includes at least one of a cause of stopping the unmanned vehicle 2 and a cause of making the unmanned vehicle 2 travel at a traveling speed lower than the target traveling speed. When the unmanned vehicle 2 is decelerated or stopped due to detection of an obstacle by the non-contact sensor 25, the cause of generating a trouble in the traveling state of the unmanned vehicle 2 includes a state in which the obstacle is detected by the non-contact sensor 25. Also, when the unmanned vehicle 2 is deviated from the target traveling course and the unmanned vehicle 2 is decelerated or stopped, the cause of generating a trouble in the traveling state of the unmanned vehicle 2 includes a state in which deviation of the unmanned vehicle 2 from the target traveling course is detected by the position sensor 26.

Also, the trouble of the unmanned vehicle 2 includes a trouble in a driving system of the unmanned vehicle 2. The trouble in the driving system of the unmanned vehicle 2 means a trouble in a driving system, which drives the traveling device, such as an engine, a generator, and an electric motor.

When a trouble is generated in the unmanned vehicle 2, the trouble data output unit 208 outputs trouble data. The trouble data output by the trouble data output unit 208 includes stoppage data indicating that the unmanned vehicle 2 is stopped due to generation of the trouble. Also, the trouble data output by the trouble data output unit 208 includes deceleration data indicating that the unmanned vehicle 2 is traveling at a traveling speed lower than the target traveling speed due to generation of the trouble.

Also, the trouble data output by the trouble data output unit 208 includes cause data indicating a cause of generating a trouble in a traveling state of the unmanned vehicle 2. When the unmanned vehicle 2 is decelerated or stopped with detection of an obstacle by the non-contact sensor 25 being a cause, the trouble data output unit 208 outputs cause data, which indicates that the non-contact sensor 25 detects the obstacle, on the basis of the obstacle data acquired by the obstacle data acquisition unit 204. Also, when the unmanned vehicle 2 is decelerated or stopped with deviation of the unmanned vehicle 2 from a target traveling course being a cause, the trouble data output unit 208 outputs cause data, which indicates that the unmanned vehicle 2 is deviated from the target traveling course, on the basis of position data of the unmanned vehicle 2 which data is acquired by the position data acquisition unit 205. With an output of the cause data, it is possible to recognize a state of the unmanned vehicle 2 promptly. Accordingly, it is possible to predict time required until the unmanned vehicle 2 is restarted, for example.

The trouble data output by the trouble data output unit 208 and the position data of the unmanned vehicle 2 in which the trouble is generated are transmitted to the management device 4 through the communication system 7.

[Control Device]

Figure 4:
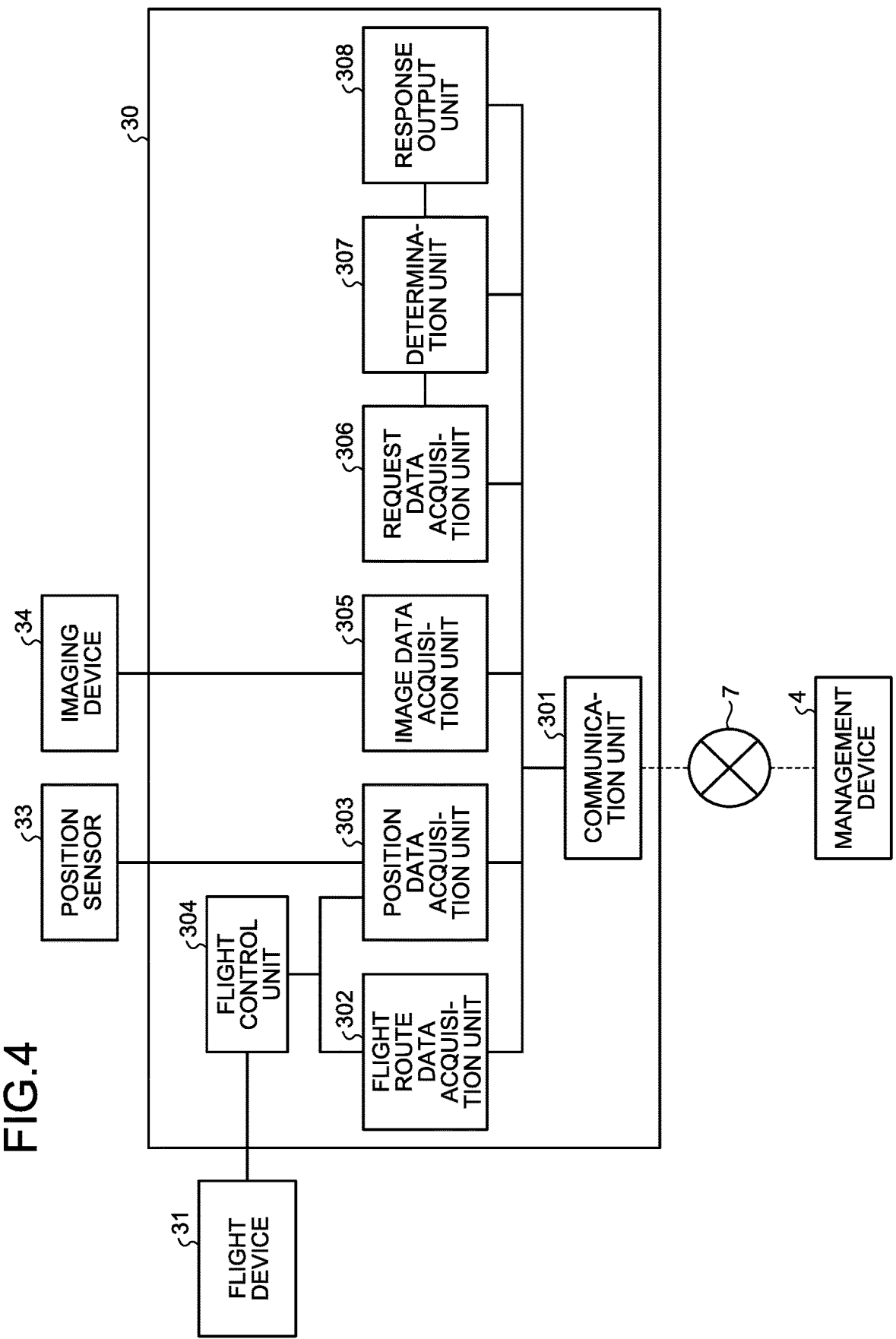
FIG. 4 is a functional block diagram illustrating the control device according to the present embodiment.

FIG. 4 is a functional block diagram illustrating the control device 30 according to the present embodiment. The control device 30 includes a computer system. The control device 30 communicates with the management device 4 wirelessly through the communication system 7.

The control device 30 includes a communication unit 301, a flight route data acquisition unit 302, a position data acquisition unit 303, a flight control unit 304, an image data acquisition unit 305, a request data acquisition unit 306, a determination unit 307, and a response output unit 308.

The communication unit 301 receives data or a signal transmitted from the management device 4 through the communication system 7. Also, the communication unit 301 transmits data or a signal to the management device 4 through the communication system 7.

From the management device 4, the flight route data acquisition unit 302 acquires position data of the unmanned vehicle 2 in which a trouble is generated. Also, from the management device 4, the flight route data acquisition unit 302 acquires flight route data indicates a flight route of the drone 3.

From the position sensor 33, the position data acquisition unit 303 acquires position data indicating an absolute position of the drone 3.

On the basis of the position data of the unmanned vehicle 2 which data is acquired by the flight route data acquisition unit 302, the flight control unit 304 controls the flight device 31 in such a manner that the drone 3 flies toward the unmanned vehicle 2.

From the imaging device 34, the image data acquisition unit 305 acquires image data of the unmanned vehicle 2 which data is imaged by the imaging device 34.

From the management device 4, the request data acquisition unit 306 acquires request data to request a flight toward the unmanned vehicle 2.

When the request data is acquired by the request data acquisition unit 306, the determination unit 307 determines whether to fly toward the unmanned vehicle 2.

The response output unit 308 outputs acceptance data or rejection data with respect to the request data on the basis of a result of the determination by the determination unit 307.

[Management Device]

Figure 5:
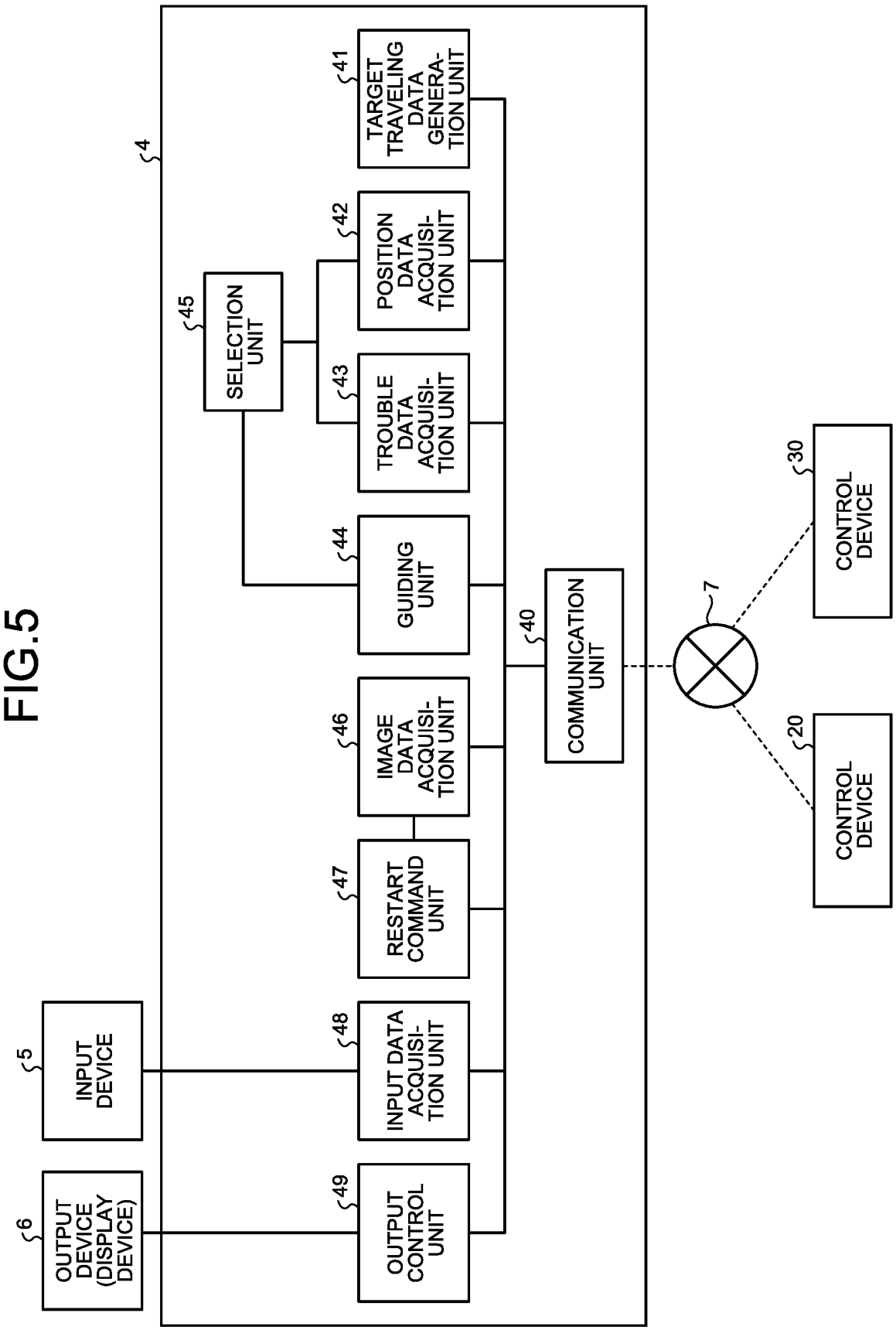
FIG. 5 is a functional block diagram illustrating a management device according to the present embodiment.

FIG. 5 is a functional block diagram illustrating the management device 4 according to the present embodiment. The management device 4 includes a computer system. The management device 4 communicates with the control device 20 and the control device 30 through the communication system 7.

The management device 4 includes a communication unit 40, a target traveling data generation unit 41, a position data acquisition unit 42, a trouble data acquisition unit 43, a guiding unit 44, a selection unit 45, an image data acquisition unit 46, a restart command unit 47, an input data acquisition unit 48, and an output control unit 49.

The communication unit 40 receives data or a signal transmitted from the control device 20 and the control device 30 through the communication system 7. Also, the communication unit 40 transmits data or a signal to the control device 20 and the control device 30 through the communication system 7.

The target traveling data generation unit 41 generates target traveling data indicating a target traveling condition of the unmanned vehicle 2. The target traveling data includes a target traveling speed and a target traveling direction at each of a plurality of points set at intervals. Target acceleration is prescribed on the basis of a difference in the target traveling speed in adjacent points. A target traveling course is prescribed by a trajectory connecting the plurality of points. Positions of the points are prescribed in the global coordinate system. The target traveling data generation unit 41 outputs the target traveling data to the control device 20 of the unmanned vehicle 2 through the communication system 7.

The position data acquisition unit 42 acquires position data of an unmanned vehicle 2 at a work site. The position data acquisition unit 42 acquires position data of an unmanned vehicle 2 stopped at a work site due to generation of a trouble. The position data of the unmanned vehicle 2 is detected by the position sensor 26 mounted in the unmanned vehicle 2. The position data acquisition unit 42 acquires the position data of the unmanned vehicle 2 from the control device 20 through the communication system 7.

The position data acquisition unit 42 acquires position data of a drone 3 at the work site. The position data of the drone 3 is detected by the position sensor 33 mounted in the drone 3. The position data acquisition unit 42 acquires the position data of the drone 3 from the control device 30 through the communication system 7.

A plurality of unmanned vehicles 2 operates at the work site. The position data acquisition unit 42 acquires position data of each of the plurality of unmanned vehicles 2. Also, a plurality of drones 3 operates at the work site. The position data acquisition unit 42 acquires position data of each of the plurality of drones 3.

The trouble data acquisition unit 43 acquires trouble data output from a trouble data output unit 208 of an unmanned vehicle 2. The trouble data acquisition unit 43 acquires the trouble data of the unmanned vehicle 2 from a control device 20 through the communication system 7.

The guiding unit 44 outputs, to a drone 3, position data of an unmanned vehicle 2 stopped due to generation of a trouble. That is, the guiding unit 44 outputs, to the drone 3, position data of a point where the unmanned vehicle 2 is stopped at the work site due to generation of a trouble and outputs the trouble data. The position data of the unmanned vehicle 2 is data to guide the drone 3 to the unmanned vehicle 2 stopped at the work site due to generation of the trouble. The guiding unit 44 outputs the position data of the unmanned vehicle 2 stopped due to generation of the trouble to a control device 30 of the drone 3 through the communication system 7.

To the drone 3, the guiding unit 44 outputs flight route data indicating a flight route from the drone 3 to the unmanned vehicle 2 stopped due to generation of the trouble on the basis of the position data of the unmanned vehicle 2, which outputs the trouble data, and the position data of the drone 3. The guiding unit 44 outputs the flight route data to the unmanned vehicle 2, in which the trouble is generated, to the control device 30 of the drone 3 through the communication system 7.

The flight route is the shortest route connecting the drone 3 and the unmanned vehicle 2.

The selection unit 45 selects a specific drone 3 from the plurality of drones 3 on the basis of the position data of the unmanned vehicle 2 and the position data of each of the plurality of drones 3. The guiding unit 44 outputs the position data of the unmanned vehicle 2 stopped due to generation of the trouble to the specific drone 3 selected by the selection unit 45.

The specific drone 3 includes a drone 3 having the shortest distance to the unmanned vehicle 2 stopped due to generation of the trouble among the plurality of drones 3 operating at the work site. The drone 3 having the shortest distance to the unmanned vehicle 2 stopped due to generation of the trouble is guided to the unmanned vehicle 2. Accordingly, a flight distance or flight time until the drone 3 arrives at the unmanned vehicle 2 stopped due to generation of the trouble is reduced.

The image data acquisition unit 46 acquires image data of the unmanned vehicle 2 which data is output from an image data acquisition unit 305 of the drone 3. The image data acquisition unit 46 acquires the image data that is of the unmanned vehicle 2 stopped due to generation of the trouble and that is imaged by an imaging device 34 mounted in the drone 3. The image data is data to determine whether the unmanned vehicle 2 is in a state of being able to resume traveling based on target traveling data. The drone 3 that arrives at the stopped unmanned vehicle 2 acquires the image data of the unmanned vehicle 2 by using the imaging device 34. Through the communication system 7, the image data acquisition unit 46 acquires the image data of the unmanned vehicle 2 which image is imaged by the imaging device 34 of the drone 3.

The restart command unit 47 outputs a restart command to restart the unmanned vehicle 2 on the basis of the image data of the unmanned vehicle 2 which data is acquired by the image data acquisition unit 46. The restart of the unmanned vehicle 2 is to make the unmanned vehicle 2, which is stopped due to generation of the trouble, resume traveling on the basis of the target traveling data. The restart command is a command to make the unmanned vehicle 2, which is stopped due to generation of the trouble, resume traveling on the basis of the target traveling data. The restart command unit 47 outputs the restart command to the control device 20 of the unmanned vehicle 2 through the communication system 7. By the output of the restart command, the stopped unmanned vehicle 2 resumes the traveling on the basis of the target traveling data.

From the input device 5, the input data acquisition unit 48 acquires input data generated by operation of the input device 5.

The output control unit 49 controls the display device 6. The output control unit 49 outputs display data to the display device 6. The display device 6 displays the display data output from the output control unit 49. In the present embodiment, the output control unit 49 outputs, to the display device 6, the image data of the unmanned vehicle 2 stopped due to generation of the trouble which data is acquired by the image data acquisition unit 46.

[Operation of Unmanned Vehicle]

Figure 6:
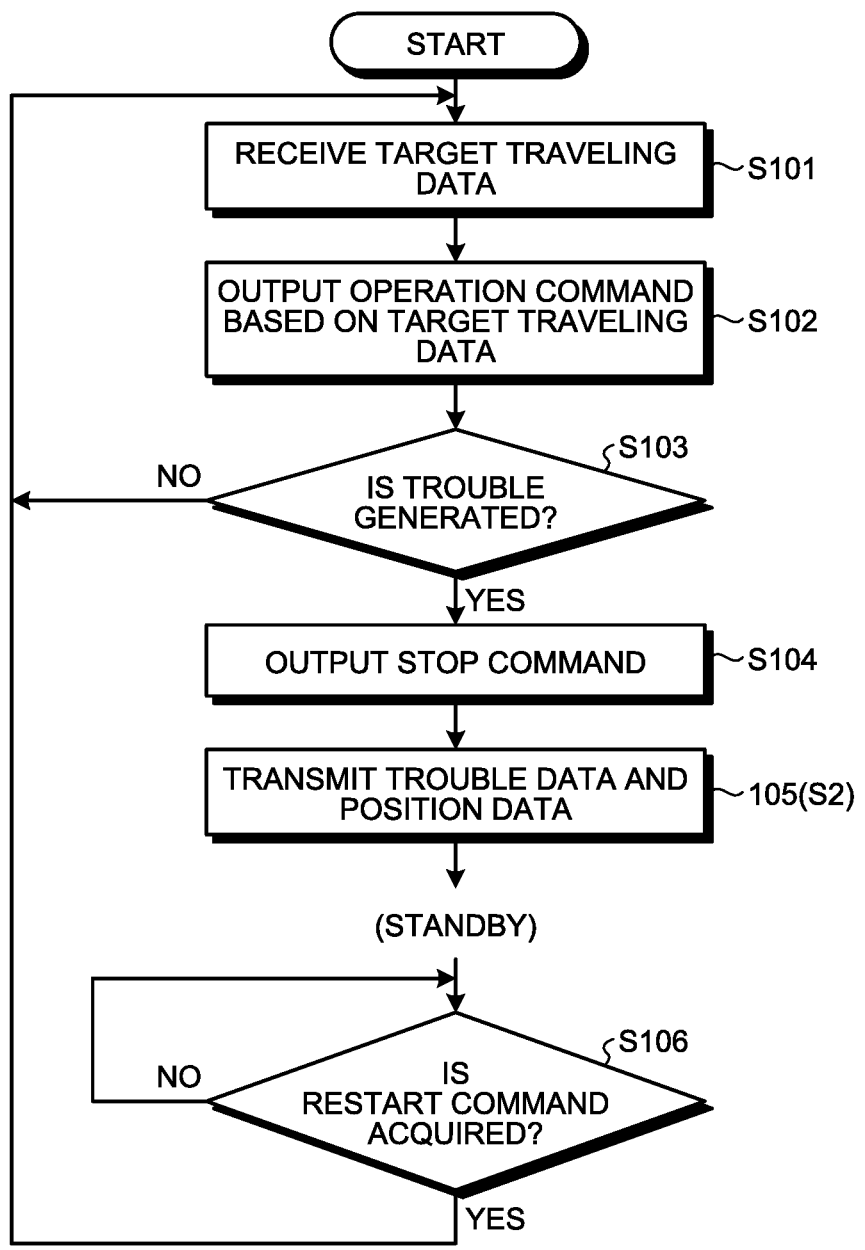
FIG. 6 is a flowchart illustrating an operation of an unmanned vehicle according to the present embodiment.

FIG. 6 is a flowchart illustrating an operation of the unmanned vehicle 2 according to the present embodiment.

Target traveling data of the unmanned vehicle 2 which data is generated by the target traveling data generation unit 41 is transmitted from the management device 4 to the control device 20 through the communication system 7. The target traveling data acquisition unit 202 receives the target traveling data from the management device 4 through the communication system 7 (step S101).

The traveling control unit 206 outputs an operation command to the traveling device 21 on the basis of the target traveling data acquired by the target traveling data acquisition unit 202 (step S102). The unmanned vehicle 2 travels on the basis of the target traveling data.

The determination unit 207 determines whether a trouble that causes generation of a trouble in a traveling state of the unmanned vehicle 2 is generated on the basis at least one of obstacle data acquired by the obstacle data acquisition unit 204, and position data of the unmanned vehicle 2 which data is acquired by the position data acquisition unit 205 (step S103).

In a case where it is determined in step S103 that the trouble that causes generation of a trouble in the traveling state of the unmanned vehicle 2 is not generated (step S103: No), the unmanned vehicle 2 keeps traveling on the basis of the target traveling data.

In a case where it is determined in step S103 that the trouble that causes generation of a trouble in the traveling state of the unmanned vehicle 2 is generated (step S103: Yes), the traveling control unit 206 outputs a stop command to stop the unmanned vehicle 2 to the traveling device 21 (step S104). Note that in a case where it is determined that the trouble that causes generation of a trouble in the traveling state of the unmanned vehicle 2 is generated, the traveling control unit 206 may output a deceleration command to decelerate the unmanned vehicle 2 to the traveling device 21.

The trouble data output unit 208 outputs trouble data indicating that a trouble is generated in the unmanned vehicle 2. The trouble data output unit 208 transmits the trouble data to the management device 4 through the communication system 7. Also, the trouble data output unit 208 transmits position data of the unmanned vehicle 2 stopped due to generation of the trouble to the management device 4 through the communication system 7 (step S105). The processing in step S105 corresponds to the processing in step S2 described with reference to FIG. 2.

The drone 3 flies to the stopped unmanned vehicle 2, and the imaging device 34 of the drone 3 acquires image data of the unmanned vehicle 2. In a case of determining, on the basis of the image data of the unmanned vehicle 2, that the unmanned vehicle 2 can resume traveling based on target traveling data, the management device 4 transmits a restart command to the control device 20 through the communication system 7 (see step S7 in FIG. 2). On the one hand, in a case where it is determined that the unmanned vehicle 2 cannot resume traveling based on the target traveling data, no restart command is transmitted from the management device 4 to the control device 20. The traveling control unit 206 determines whether the restart command is acquired from the management device 4 (step S106).

In a case where it is determined in step S106 that the restart command is not acquired (step S106: No), the unmanned vehicle 2 keeps a state of being stopped.

In a case where it is determined in step S106 that the restart command is acquired (step S106: Yes), the traveling control unit 206 outputs an operation command to the traveling device 21 on the basis of the target traveling data. The unmanned vehicle 2 resumes traveling on the basis of the target traveling data.

[Operation of Management Device]

Figure 7:
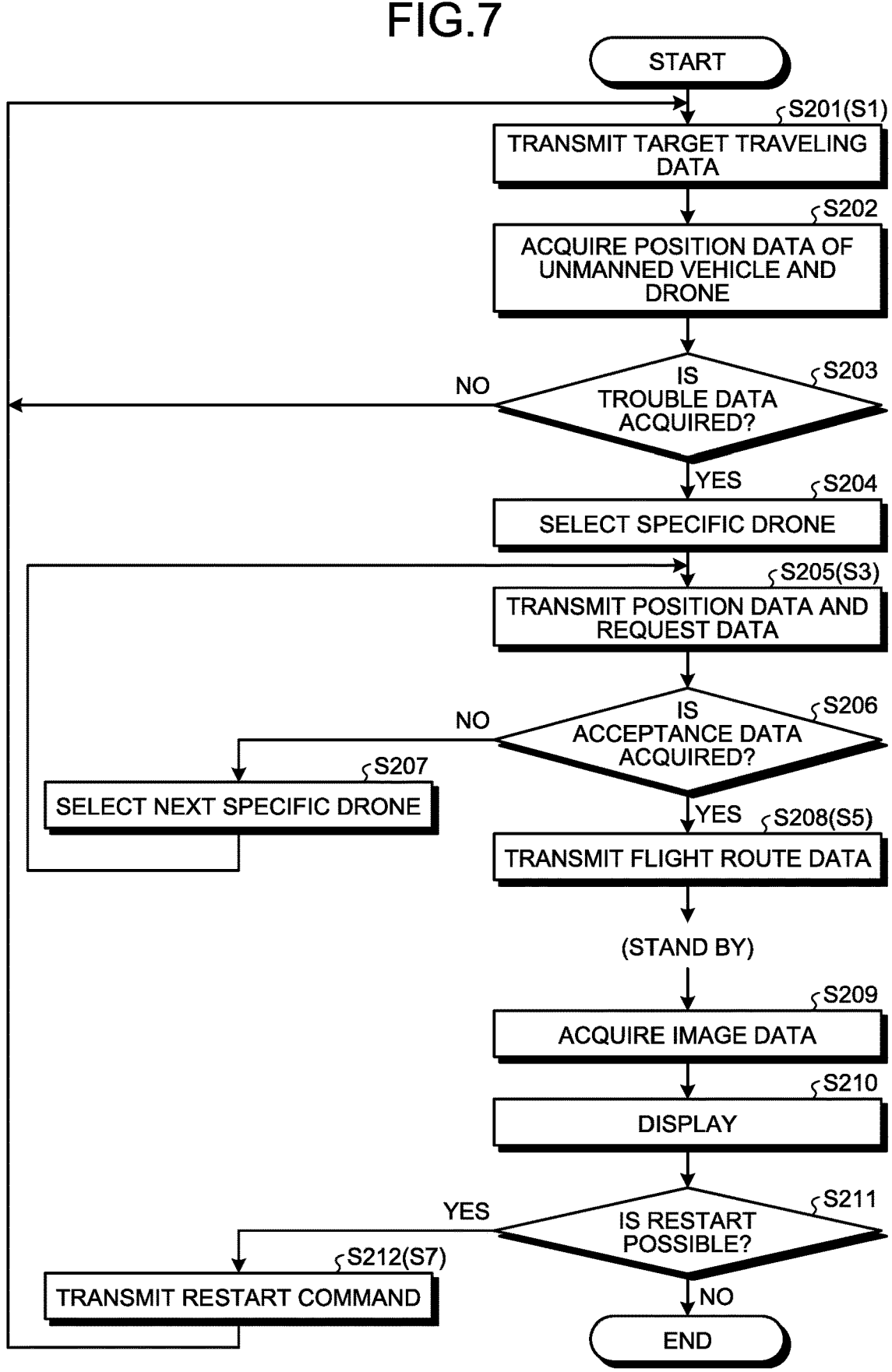
FIG. 7 is a flowchart illustrating an operation of the management device according to the present embodiment.

FIG. 7 is a flowchart illustrating an operation of the management device 4 according to the present embodiment. The target traveling data generation unit 41 generates target traveling data of the unmanned vehicle 2. The target traveling data generation unit 41 transmits the target traveling data to the control device 20 through the communication system 7 (step S201). The processing in step S201 corresponds to the processing in step S1 described with reference to FIG. 2.

The position data acquisition unit 42 acquires position data of the unmanned vehicle 2 and position data of the drone 3 operating at the work site through the communication system 7 (step S202). In a case where there is a plurality of unmanned vehicles 2 at the work site, the position data acquisition unit 42 acquires position data of each of the plurality of unmanned vehicles 2. Also, in a case where there is a plurality of drones 3 at the work site, the position data acquisition unit 42 acquires position data of each of the plurality of drones 3.

In a case where a trouble is generated in an unmanned vehicle 2, the control device 20 transmits position data of the unmanned vehicle 2 in which the trouble is generated, and trouble data to the management device 4 through the communication system 7 (see step S2 in FIG. 2). On the one hand, in a case where no trouble is generated in an unmanned vehicle 2, trouble data is transmitted from the control device 20 to the management device 4. The trouble data acquisition unit 43 determines whether trouble data is acquired from the unmanned vehicle 2 (step S203).

In a case where it is determined in step S203 that the trouble data is not acquired (step S203: No), the management device 4 performs the processing in step S201. The unmanned vehicle 2 keeps traveling based on the target traveling data.

In a case where it is determined in step S203 that the trouble data is acquired (step S203: Yes), the management device 4 starts processing of guiding a drone 3 to the unmanned vehicle 2 stopped due to generation of the trouble.

The selection unit 45 selects a specific drone 3 from the plurality of drones 3 on the basis of position data of the unmanned vehicle 2 in which the trouble is generated and position data of each of the plurality of drones 3 that exists at the work site (step S204).

The selection unit 45 selects, as the specific drone 3, a drone 3 having the shortest distance (direct distance) to the unmanned vehicle 2 is stopped due to generation of the trouble among the plurality of drones 3.

Figure 8:
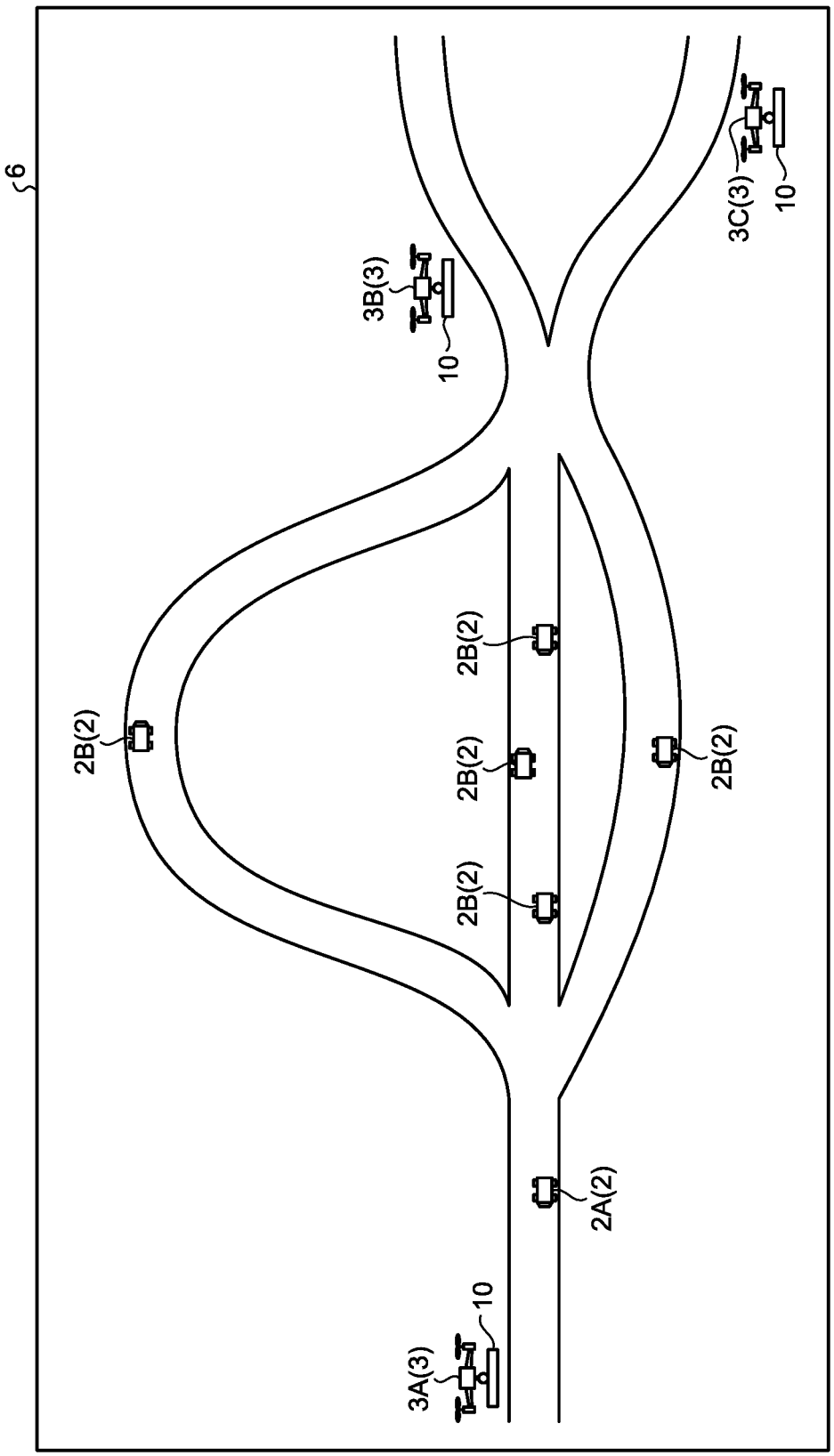
FIG. 8 is a view illustrating an example of a display device according to the present embodiment.

FIG. 8 is a view illustrating an example of the display device 6 according to the present embodiment. As illustrated in FIG. 8, the output control unit 49 displays map data of a work site, position data of an unmanned vehicle 2, and position data of a drone 3 on the display device 6.

When not flying, the drone 3 is installed in a standby facility 10 prescribed at the work site. A charger that charges a rechargeable battery mounted in the drone 3 is provided in the standby facility 10. The drone 3 charges the rechargeable battery with the charger in the standby facility 10.

The output control unit 49 displays an icon of the unmanned vehicle 2 on the display device 6 as the position data of the unmanned vehicle 2. Also, the output control unit 49 displays an icon of the drone 3 on the display device 6 as the position data of the drone 3. For example, when a position of the unmanned vehicle 2 is changed by traveling, the output control unit 49 updates a position of the icon of the unmanned vehicle 2 or moves the icon of the unmanned vehicle 2 on a display screen of the display device 6 on the basis of the position data of the unmanned vehicle 2. Also, for example, when a position of the drone 3 is changed by a movement, the output control unit 49 updates a position of the icon of the drone 3 or moves the icon of the drone 3 on the display screen of the display device 6 on the basis of the position data of the drone 3. Accordingly, a controller Wb can visually and intuitively recognize the position of the unmanned vehicle 2 and the position of the drone 3 at the work site.

In the example illustrated in FIG. 8, it is assumed that a trouble is generated in an unmanned vehicle 2A and the unmanned vehicle 2A is stopped. A different unmanned vehicle 2B is traveling on the basis of the target traveling data. Also, it is assumed that drones 3A, 3B, and 3C exist in a standby field prescribed at the work site.

The output control unit 49 may display the unmanned vehicle 2A stopped due to generation of the trouble on the display device 6 in such a manner that a display form thereof is different from a display form of the different unmanned vehicle 2B. For example, the output control unit 49 may display an icon of the unmanned vehicle 2A and an icon of the unmanned vehicle 2B on the display device 6 in such a manner that at least one of a design, a hue, brightness, and color intensity thereof becomes different from each other. Also, the output control unit 49 may continuously display one of the icon of the unmanned vehicle 2A and the icon of the unmanned vehicle 2B and display the other in a blinking manner.

The selection unit 45 can calculate a distance between the unmanned vehicle 2A and the drone 3A on the basis of position data of the unmanned vehicle 2A and position data of the drone 3A. Similarly, the selection unit 45 can calculate a distance between the unmanned vehicle 2A and the drone 3B, and a distance between the unmanned vehicle 2A and the drone 3C.

In the example illustrated in FIG. 8, the distance between the unmanned vehicle 2A and the drone 3A is the shortest, the distance between the unmanned vehicle 2A and the drone 3B is the second shortest, and the distance between the unmanned vehicle 2A and the drone 3C is the longest.

The selection unit 45 selects, as a specific drone 3, the drone 3A having the shortest distance to the unmanned vehicle 2A stopped due to generation of the trouble among the plurality of drones 3A, 3B, and 3C.

The guiding unit 44 outputs request data that requests the drone 3A selected by the selection unit 45 to fly toward the unmanned vehicle 2A stopped due to generation of the trouble. To the drone 3A selected by the selection unit 45, the guiding unit 44 transmits position data of the unmanned vehicle 2A stopped due to generation of the trouble and the request data to request a flight toward the unmanned vehicle 2A, in which the trouble is generated, through the communication system 7 (step S205). The processing in step S205 corresponds to the processing in step S3 described with reference to FIG. 2.

The drone 3A receives the position data of the unmanned vehicle 2A and the request data. In a case where the control device 30 of the drone 3A accepts the flight toward the unmanned vehicle 2A, acceptance data to accept traveling toward the unmanned vehicle 2A is generated. On the other hand, in a case where a control device 30 of the drone 3A rejects the flight toward the unmanned vehicle 2A, rejection data to reject the flight toward the unmanned vehicle 2A is generated. For example, there is a case where the drone 3A has difficulty or is unable to fly toward the unmanned vehicle 2A such as a case where a rechargeable battery of the drone 3A is not charged enough or the drone 3A performs a different operation. In a case where the drone 3A has difficulty or is unable to fly toward the unmanned vehicle 2A, the control device 30 of the drone 3A generates rejection data to reject traveling toward the unmanned vehicle 2A. The acceptance data or the rejection data generated by the control device 30 is transmitted to the management device 4 through the communication system 7.

From the drone 3A, the selection unit 45 acquires the acceptance data or the rejection data with respect to the request data through the communication system 7. The selection unit 45 determines whether the acceptance data is acquired from the drone 3A (step S206).

In a case where it is determined in step S206 that the rejection data is acquired from the drone 3A (step S206: No), the selection unit 45 selects a next specific drone 3 from the plurality of drones 3 (step S207). As the next specific drone 3, the selection unit 45 selects the drone 3B having the shortest distance (direct distance) to the unmanned vehicle 2A, in which the trouble is generated, following the drone 3A among the plurality of drones 3A, 3B, and 3C.

The guiding unit 44 transmits the position data of the unmanned vehicle 2A and the request data to the drone 3B selected by the selection unit 45 (step S205). The selection unit 45 determines whether the acceptance data is acquired from the drone 3B (step S206).

In a case where the acceptance data is not acquired from the drone 3B, the drone 3C having the shortest distance to the unmanned vehicle 2A following the drone 3B is selected as a next specific drone 3, and the position data of the unmanned vehicle 2A and the request data are transmitted to the drone 3C. In the following, a drone 3 having a short distance to the unmanned vehicle 2A is serially selected and processing of transmitting the position data of the unmanned vehicle 2A and the request data is performed until the acceptance data is acquired.

In the present embodiment, it is assumed that the acceptance data is output from the drone 3B. In a case where it is determined in step S206 that the acceptance data is acquired from the drone 3B (step S206: Yes), the guiding unit 44 outputs, to the drone 3B, a flight route to the unmanned vehicle 2A on the basis of the position data of the unmanned vehicle 2A and position data of the drone 3B. The flight route is the shortest route (direct route) that connects the drone 3B and the unmanned vehicle 2A, for example.

The guiding unit 44 transmits flight route data, which indicates the flight route to the unmanned vehicle 2A, to the drone 3B through the communication system 7 (step S208). The processing in step S208 corresponds to the processing in step S5 described with reference to FIG. 2.

On the basis of the flight route data, the drone 3B flies toward the unmanned vehicle 2A in which the trouble is generated. The drone 3B that arrives at the above of the unmanned vehicle 2A acquires image data of the unmanned vehicle 2A by using the imaging device 34. The image data of the unmanned vehicle 2A which data is imaged by the imaging device 34 of the drone 3B is transmitted to the management device 4 through the communication system 7.

Through the communication system 7, the image data acquisition unit 46 acquires the image data of the unmanned vehicle 2A which data is imaged by the imaging device 34 (step S209).

On the display device 6, the output control unit 49 displays the image data of the unmanned vehicle 2A which data is acquired by the image data acquisition unit 46 (step S210).

Figure 9:
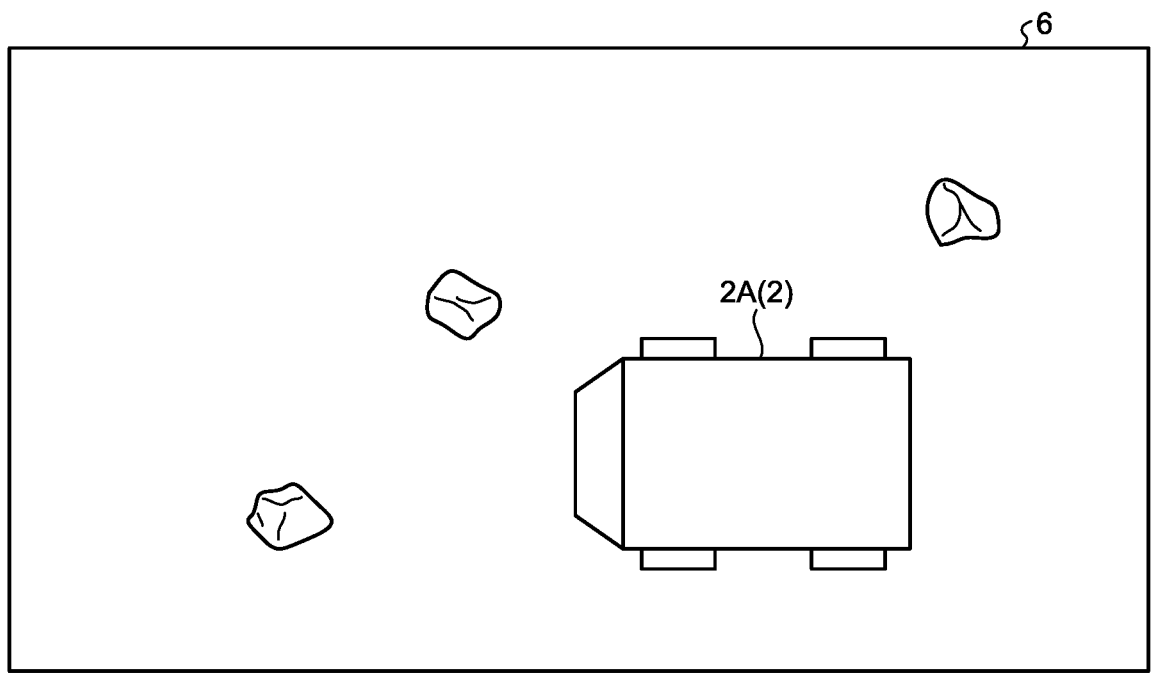
FIG. 9 is a view illustrating an example of the display device according to the present embodiment.

FIG. 9 is a view illustrating an example of the display device 6 according to the present embodiment. As illustrated in FIG. 9, the output control unit 49 displays, on the display device 6, image data of an unmanned vehicle 2 which data is imaged by the imaging device 34. The drone 3B acquires the image data of the unmanned vehicle 2 from the above of the unmanned vehicle 2 by using the imaging device 34. The image data of the unmanned vehicle 2 includes image data around the unmanned vehicle 2.

The restart command unit 47 determines whether the unmanned vehicle 2A can be restarted on the basis of the image data of the unmanned vehicle 2A which data is acquired by the image data acquisition unit 46 (step S211).

For example, in a case where the control device 20 of the unmanned vehicle 2A determines that there is an obstacle around the unmanned vehicle 2A and stops the unmanned vehicle 2A on the basis of detection data from the non-contact sensor 25, there is a case where no obstacle actually exists. For example, when the non-contact sensor 25 erroneously detects a recess/protrusion in a traveling road as an obstacle, there is a case where the unmanned vehicle 2A is stopped although the unmanned vehicle 2A can actually keep traveling. The restart command unit 47 performs image processing of the image data of the unmanned vehicle 2A which data is acquired by the imaging device 34, and determines whether there is an obstacle around the unmanned vehicle 2A.

In a case where it is determined in step S211 that there is an obstacle around the unmanned vehicle 2A and the unmanned vehicle 2A cannot be restarted (step S211: No), the output control unit 49 displays, on the display device 6, display data indicating that the unmanned vehicle 2A cannot be restarted. For example, in a case where it is determined, as a result of the image processing of the image data of the unmanned vehicle 2A, that there is an obstacle in front of the unmanned vehicle 2A and the unmanned vehicle 2A cannot travel, the restart command unit 47 determines that the unmanned vehicle 2A cannot be restarted. The output control unit 49 displays, on the display device 6, display data indicating that the unmanned vehicle 2A cannot be restarted. By looking at the display device 6, the controller Wb can give an instruction to a worker to remove the obstacle existing around the unmanned vehicle 2A, for example.

In a case where it is determined in step S211 that there is no obstacle around the unmanned vehicle 2A and the unmanned vehicle 2A can be restarted (step S211: Yes), the restart command unit 47 outputs a restart command to restart the unmanned vehicle 2A. For example, in a case where it is determined, as a result of the image processing of the image data of the unmanned vehicle 2A, that there is no obstacle around the unmanned vehicle 2A and the unmanned vehicle 2A can travel, the restart command unit 47 outputs a restart command. The restart command unit 47 transmits the restart command to the unmanned vehicle 2A through the communication system 7 (step S212). The processing in step S211 corresponds to the processing in step S7 described with reference to FIG. 2.

The unmanned vehicle 2A that acquires the restart command resumes traveling on the basis of the target traveling data on the basis of the target traveling data.

Note that the controller Wb may determine whether the unmanned vehicle 2A can be restarted in step S211. Since the image data of the unmanned vehicle 2A is displayed on the display device 6, the controller Wb can check a condition of the unmanned vehicle 2A by looking at the display device 6. In a case of looking at the display device 6 on which the image data of the unmanned vehicle 2A is displayed and determining that there is actually an obstacle and the unmanned vehicle 2A cannot travel, the controller Wb operates the input device 5 and generates determination data indicating that the unmanned vehicle 2A cannot travel. The output control unit 49 displays, on the display device 6, display data indicating that the unmanned vehicle 2A cannot be restarted.

On the other hand, in a case of looking at the display device 6 on which the image data of the unmanned vehicle 2A is displayed and determining that there is not actually an obstacle and the unmanned vehicle 2A can travel, the controller Wb operates the input device 5 and generates determination data indicating that the unmanned vehicle 2A can travel. The restart command unit 47 transmits a restart command to the unmanned vehicle 2A through the communication system 7 (step S212).

[Operation of Flight Vehicle]

Figure 10:
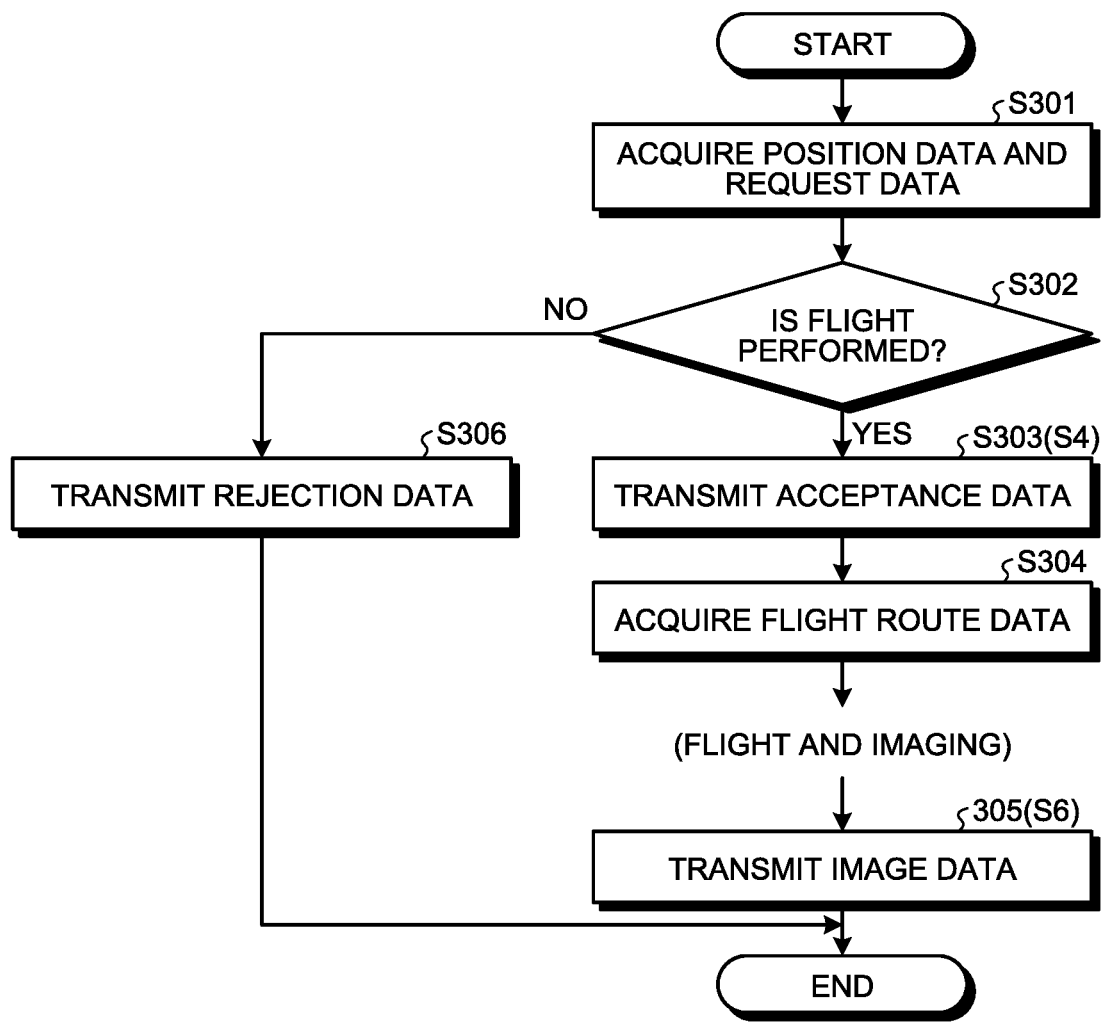
FIG. 10 is a flowchart illustrating an operation of a flight vehicle according to the present embodiment.

FIG. 10 is a flowchart illustrating an operation of the flight vehicle 3 according to the present embodiment. When a trouble is generated in the unmanned vehicle 2A, the management device 4 performs processing in step S205 (step S3) described above. That is, the management device 4 transmits the position data of the unmanned vehicle 2A stopped due to generation of the trouble and the request data to the drone 3B through the communication system 7. The flight route data acquisition unit 302 acquires the position data of the unmanned vehicle 2A from the management device 4. The request data acquisition unit 306 acquires the request data from the management device 4 (step S301).

When the request data is acquired by the request data acquisition unit 306, the determination unit 307 determines whether to fly toward the unmanned vehicle 2A (step S302).

For example, when charging of a rechargeable battery is completed and a different operation is not scheduled in the drone 3B, the determination unit 307 determines to fly toward the unmanned vehicle 2A. On the other hand, for example, when charging of a rechargeable battery is not enough or the drone 3B is scheduled to perform a different operation, the determination unit 307 determines not fly toward the unmanned vehicle 2A.

In a case where it is determined to fly toward the unmanned vehicle 2A in step S302 (step S302: Yes), the response output unit 308 generates acceptance data to accept the flight toward the unmanned vehicle 2A. The response output unit 308 transmits the acceptance data to the management device 4 through the communication system 7 (step S303). The processing in step S303 corresponds to the processing in step S4 described with reference to FIG. 2.

In a case where it is determined not to fly toward the unmanned vehicle 2A in step S302 (step S302: No), the response output unit 308 generates rejection data to reject traveling toward the unmanned vehicle 2A. The response output unit 308 transits the rejection data to the management device 4 through the communication system 7 (step S306).

The management device 4 generates flight route data and transmits the flight route data to the control device 30 through the communication system 7. The flight route data acquisition unit 302 acquires the flight route data (step S304).

The flight control unit 304 activates the flight device 31 on the basis of the flight route data and makes the drone 3B fly to the unmanned vehicle 2A. The imaging device 34 of the drone 3B that arrives at the unmanned vehicle 2A images the unmanned vehicle 2.

The controller Wb can acquire the image data of the unmanned vehicle 2A while changing a relative position of the drone 3B with respect to the unmanned vehicle 2A by remote operation of the drone 3B. Also, in a case where an optical system of the imaging device 34 includes a zoom lens, the controller Wb may acquire the image data while enlarging or contracting an optical image of the unmanned vehicle 2A by remote operation of the optical system of the imaging device 34.

The image data of the unmanned vehicle 2A which data is acquired by the imaging device 34 is acquired by the image data acquisition unit 305. The image data acquisition unit 305 transmits image data of an unmanned vehicle 2 to the management device 4 through the communication system 7 (step S305). The processing in step S305 corresponds to the processing in step S6 described with reference to FIG. 2.

[Effect]

As described above, position data of the unmanned vehicle 2A stopped due to generation of a trouble is output to the drone 3B according to the present embodiment. Accordingly, the drone 3B can fly toward the unmanned vehicle 2A on the basis of the position data of the unmanned vehicle 2A. The drone 3B can promptly acquire image data of the unmanned vehicle 2A. Also, it is possible to take an appropriate measure on the basis of the image data of the unmanned vehicle 2A which data is acquired by the drone 3B. Thus, a decrease in productivity at a work site is controlled.

The restart command unit 47 outputs a restart command to restart the unmanned vehicle 2A on the basis of the image data of the unmanned vehicle 2A. Accordingly, it is possible to resume traveling on the basis of target traveling data of the unmanned vehicle 2A in a condition in which the unmanned vehicle 2A can travel. Thus, a decrease in productivity at a work site is controlled.

The guiding unit 44 outputs a flight route from the drone 3B to the unmanned vehicle 2A on the basis of the position data of the unmanned vehicle 2A and the position data of the drone 3B. Accordingly, the drone 3B can promptly fly to the unmanned vehicle 2A according to the flight route.

The flight route is the shortest route (direct route) that connects the drone 3B and the unmanned vehicle 2A. Accordingly, a flight distance of the drone 3B becomes short and the drone 3B can arrive at the unmanned vehicle 2A in a short period.

In a case where there is a plurality of drones 3 at the work site, the selection unit 45 selects a specific drone 3 from the plurality of drones 3, and the guiding unit 44 transmits position data of an unmanned vehicle 2A stopped due to generation of a trouble to the specific drone 3 selected by the selection unit 45. Accordingly, an appropriate drone 3 selected from the plurality of drones 3 is guided to the unmanned vehicle 2A.

As a specific drone 3 made to fly toward the unmanned vehicle 2A, the selection unit 45 selects a drone 3 having the shortest distance to the unmanned vehicle 2A among the plurality of drones 3. Accordingly, the selected specific drone 3 can arrive at the unmanned vehicle 2A in a short period.

The selection unit 45 acquires, from a drone 3, acceptance data or rejection data with respect to request data and determines a drone 3 made to fly toward the unmanned vehicle 2A. Accordingly, it is possible to control assignment of operation of checking a condition of the unmanned vehicle 2A to a drone 3 that has difficulty to fly or is unable to fly toward the unmanned vehicle 2A.

[Computer System]

Figure 11:
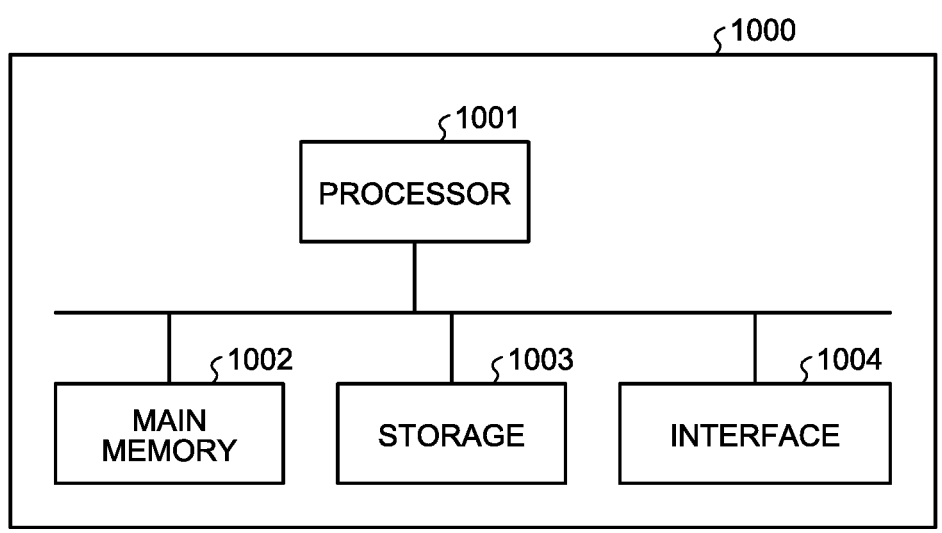
FIG. 11 is a block diagram illustrating an example of a computer system according to the present embodiment.

FIG. 11 is a block diagram illustrating an example of a computer system 1000 according to the present embodiment. Each of the above-described management device 4, control device 20, and control device 30 includes the computer system 1000. The computer system 1000 includes a processor 1001 such as a central processing unit (CPU), a main memory 1002 including a non-volatile memory such as a read only memory (ROM) and a volatile memory such as a random access memory (RAM), a storage 1003, and an interface 1004 including an input/output circuit. The above-described function of the management device 4, function of the control device 20, and function of the control device 30 are stored as programs in the storage 1003. The processor 1001 reads a program from the storage 1003, extracts the program into the main memory 1002, and executes the above-described processing according to the program. Note that the program may be distributed to the computer system 1000 through a network.

Note that in the above-described embodiment, a control device 20 of an unmanned vehicle 2 may have a function of at least a part of the management device 4, and a control device 30 of a drone 3 may have a function of at least a part of the management device 4. That is, the control device 20 may function as a management device 4 or the control device 30 may function as a management device 4. For example, at least one of the control device 20 and the control device 30 may have functions of the target traveling data generation unit 41, the position data acquisition unit 42, the trouble data acquisition unit 43, the guiding unit 44, the selection unit 45, the image data acquisition unit 46, and the restart command unit 47. For example, the control device 30 may generate a flight route from the drone 3 to the unmanned vehicle 2 on the basis of position data of the unmanned vehicle 2 and position data of the drone 3.

The computer system 1000 including at least one of the management device 4, the control device 20, and the control device 30 may execute acquisition of position data of an unmanned vehicle 2 that outputs trouble data at a work site, and an output of the position data of the unmanned vehicle 2, which outputs the trouble data, to a drone 3 that can fly at the work site. Accordingly, it is possible to control a decrease productivity at a work site at which an unmanned vehicle 2 is operated.

Different Embodiment

Note that in the above-described embodiment, it is assumed that an unmanned vehicle 2 in which a trouble is generated is stopped. However, the unmanned vehicle 2 in which the trouble is generated may be decelerated. As described above, a trouble in a traveling state of the unmanned vehicle 2 includes a state in which the unmanned vehicle 2 travels at a traveling speed lower than a target traveling speed. The guiding unit 44 may output position data of the decelerated unmanned vehicle 2 to a drone 3.

In addition to an imaging device 34, the drone 3 may include a microphone device that can acquire sound data around an unmanned vehicle 2A, for example.

In the above-described embodiment, in a case where a trouble is generated, the unmanned vehicle 2A may be stopped, or may be decelerated to a traveling speed lower than a target traveling speed without being stopped.

In the above-described embodiment, it is assumed that the selection unit 45 selects, as a specific drone 3 made to fly toward the unmanned vehicle 2A, a drone 3 having the shortest distance to the unmanned vehicle 2A among the plurality of drones 3. For example, a selection unit 45 may select a drone 3 having a high flight speed as a specific drone 3 or may select a drone 3 having a highly charged battery field as a specific drone 3.

Note that a flight route of a drone 3 to an unmanned vehicle 2A may not be the shortest route (direct route) connecting the drone 3 and the unmanned vehicle 2A. For example, in a case where there is an obstacle such as a part of a mine between the unmanned vehicle 2A and the drone 3, the guiding unit 44 may generate a flight route avoiding the obstacle as the flight route.

In the above-described embodiment, it is assumed that image data of the unmanned vehicle 2A which data is imaged by the imaging device 34 is transmitted to the management device 4 and the restart command unit 47 of the management device 4 outputs a restart command for the unmanned vehicle 2A. A control device 30 of a drone 3 may perform image monk processing of image data of an unmanned vehicle 2A, generate a restart command on the basis of a result of image processing, and transmit the generated restart command to the unmanned vehicle 2A not through a management device 4. That is, the restart command generated in the drone 3 may be transmitted from the drone 3 to the unmanned vehicle 2A.

Also, position data of the unmanned vehicle 2A stopped due to generation of a trouble may be transmitted from a control device 20 of the unmanned vehicle 2A to the control device 30 of the drone 3 not through the management device 4. With such an arrangement, the drone 3 can also fly toward the unmanned vehicle 2A stopped due to generation of a trouble.

In the above-described embodiment, it is assumed that the drone 3 is installed in the standby facility 10 prescribed at the work site. A drone 3 may be mounted in an unmanned vehicle 2. The drone 3 mounted in the unmanned vehicle 2 may have a configuration of performing communication in a wired or wireless manner. In this case, when the unmanned vehicle 2 is stopped, the drone 3 is raised to a position where an image of at least a front region of the unmanned vehicle 2 can be imaged, and imaging can be performed by an imaging device 34. The imaging device 34 may include a single camera or a plurality of cameras. Also, in this case, a management device 4 may not include a position data acquisition unit 42, and a guiding unit 44 may not output position data of a stopped unmanned vehicle 2A to the drone 3.

Figure 12:
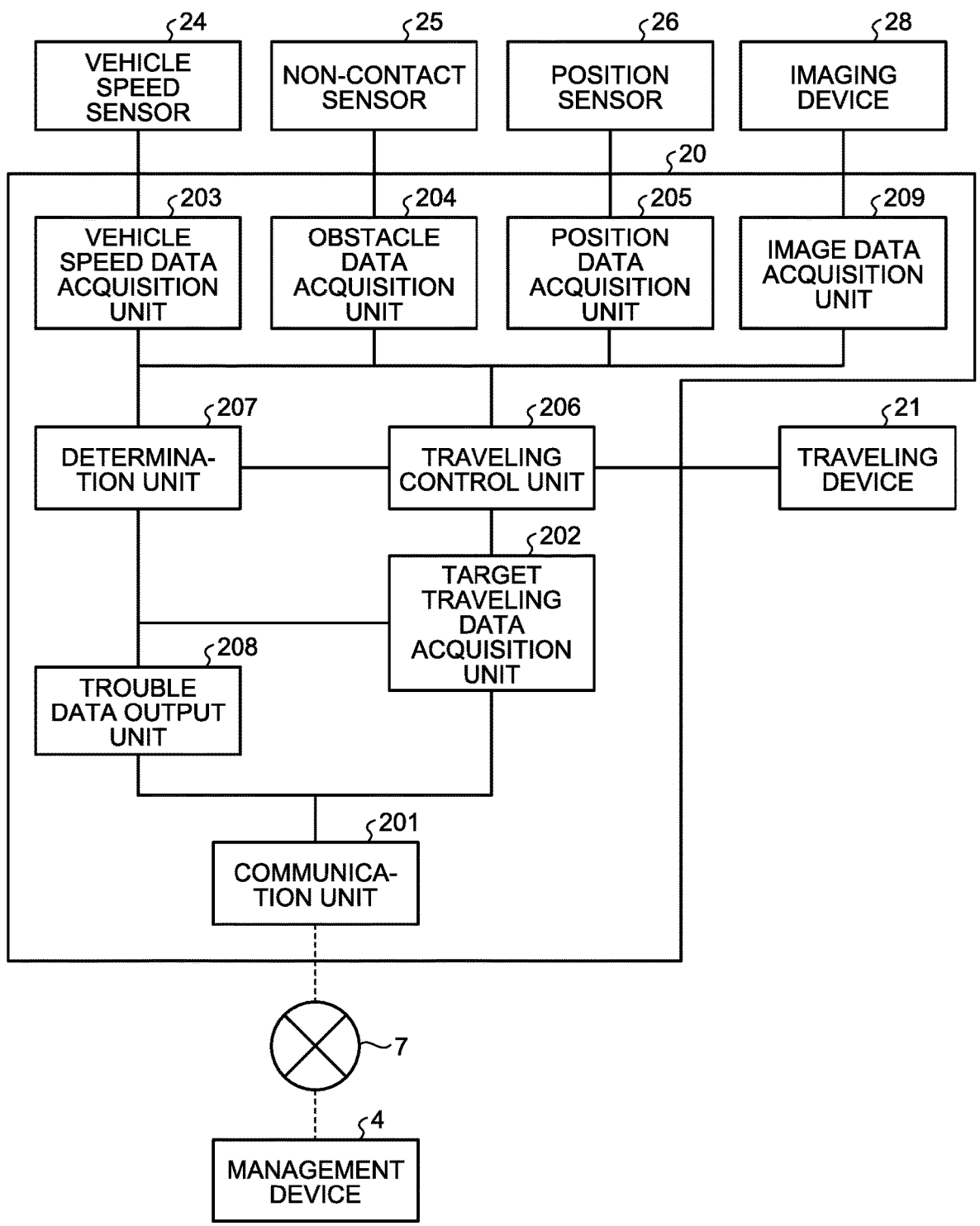
FIG. 12 is a functional block diagram illustrating an unmanned vehicle according to the present embodiment.

Note that in the above-described embodiment, it is assumed that a movable body in which an imaging device is mounted is a drone 3. However, a movable body in which an imaging device is mounted may be an unmanned vehicle 2. For example, image data of an unmanned vehicle 2A stopped due to generation of a trouble may be imaged by an imaging device mounted in the stopped unmanned vehicle 2A. Note that the movable body in which the imaging device is mounted and the stopped unmanned vehicle 2A may be the same. FIG. 12 is a functional block diagram illustrating an unmanned vehicle 2A according to the present embodiment. The functional block diagram illustrated in FIG. 12 is different from the functional block illustrated in FIG. 3 in a point that a stopped unmanned vehicle 2A includes an imaging device 28, and a control device 20 includes an image data acquisition unit 209 to acquire image data of the stopped unmanned vehicle 2A which data is imaged by the imaging device 28. When the unmanned vehicle 2A is stopped due to generation of a trouble, the imaging device 28 images image data of the unmanned vehicle 2A. The image data of the stopped unmanned vehicle 2A includes image data of at least a front side of the vehicle around the unmanned vehicle 2A. One or a plurality of imaging devices 28 may be provided in the unmanned vehicle 2A. Also, for example, a front side of the vehicle of the unmanned vehicle 2A may be imaged by one camera provided in the unmanned vehicle 2A, or image data may be an image in which a whole periphery around the unmanned vehicle 2A is imaged by a plurality of cameras. The image data imaged by the imaging device 28 is transmitted to the management device 4 through a communication system 7. An output control unit 49 of the management device 4 can display the image data of the unmanned vehicle 2A, which data is imaged by the imaging device 28, on a display device 6. Note that in FIG. 12, the management device 4 may not include a position data acquisition unit 42, and a guiding unit 44 may not output position data of the stopped unmanned vehicle 2A to the drone 3.

Note that in the above-described embodiment, it is assumed that the unmanned vehicle 2 is a dump truck that is a kind of a transporting vehicle. An unmanned vehicle 2 may be a working machine, which includes a working equipment, such as an excavator or a bulldozer. The working machine including a working equipment may be remotely operated.

REFERENCE SIGNS LIST 1 management system
2 unmanned vehicle
3 drone (flight vehicle)
4 management device
5 input device
6 display device (output device)
7 communication system
8 control facility
9 wireless communication machine
10 standby facility
20 control device
21 traveling device
21B brake device
21D drive device
21H wheel
21S steering device
22 vehicle main body
23 dump body
24 vehicle speed sensor
25 non-contact sensor
26 position sensor
27 wireless communication machine
28 imaging device
30 control device
31 flight device
31D drive device
31P propeller
32 main body
33 position sensor
34 imaging device
36 wireless communication machine
40 communication unit
41 target traveling data generation unit
42 position data acquisition unit
43 trouble data acquisition unit
44 guiding unit
45 selection unit 46 image data acquisition unit
47 restart command unit
48 input data acquisition unit
49 output control unit
201 communication unit
202 target traveling data acquisition unit
203 vehicle speed data acquisition unit
204 obstacle data acquisition unit
205 position data acquisition unit
206 traveling control unit
207 determination unit
208 trouble data output unit
209 image data acquisition unit
301 communication unit
302 flight route data acquisition unit
303 position data acquisition unit
304 flight control unit
305 image data acquisition unit
306 request data acquisition unit
307 determination unit
308 response output unit
Wb controller

The invention claimed is:

1. A management system of a work site, comprising:
a determination unit configured to acquire determination data that determines whether an unmanned vehicle is traveling in a condition different from target traveling condition due to an abnormality;
an image data acquisition unit that can acquire image data of the unmanned vehicle when vehicle operation is stopped at the work site due to generation of a trouble, for example a traveling condition around the unmanned vehicle like an obstacle or a driving system of the unmanned vehicle like an engine, the image data being imaged by an imaging device mounted in a movable body; and
a restart command unit that restarts the operation of the unmanned vehicle on the basis of the determination data and the image data, when it is determined that there is no obstacle around the unmanned vehicle.

2. The management system of a work site according to claim 1, further comprising
a position data acquisition unit that acquires position data of the stopped unmanned vehicle, and
a guiding unit that outputs the position data of the stopped unmanned vehicle to the movable body.

3. The management system of a work site according to claim 2,
wherein the movable body includes a flight vehicle that flies at the work site,
the position data acquisition unit acquires position data of the flight vehicle, and
the guiding unit outputs, to the flight vehicle, a flight route from the flight vehicle to the unmanned vehicle on the basis of the position data of the unmanned vehicle and the position data of the flight vehicle.

4. The management system of a work site according to claim 3,
wherein the flight route is a shortest route connecting the flight vehicle and the unmanned vehicle.

5. The management system of a work site according to claim 3, further comprising:
a plurality of the flight vehicles, wherein the position data acquisition unit acquires position data of each of the plurality of the flight vehicles,
a selection unit that selects a specific flight vehicle from the plurality of flight vehicles on the basis of the position data of the unmanned vehicle and the position data of each of the plurality of flight vehicles is further comprised, and
the guiding unit outputs the position data of the unmanned vehicle to the specific flight vehicle selected by the selection unit.

6. The management system of a work site according to claim 5,
wherein the specific flight vehicle is a flight vehicle having a shortest distance to the unmanned vehicle among the plurality of flight vehicles.

7. The management system of a work site according to claim 5,
wherein the guiding unit outputs request data to the flight vehicle, and
the selection unit acquires, from the flight vehicle, acceptance data or rejection data with respect to the request data.

8. A management method of a work site, comprising:
acquiring determination data that determines whether an unmanned vehicle is traveling in a condition different from target traveling condition due to an abnormality;
acquiring image data of the unmanned vehicle when vehicle operation is stopped at the work site due to generation of a trouble, for example a traveling condition around the unmanned vehicle like an obstacle or a driving system of the unmanned vehicle like an engine, the image data being imaged by an imaging device mounted in a movable body; and
restarting the operation of the unmanned vehicle on the basis of the determination data and the image data, when it is determined that there is no obstacle around the unmanned vehicle.

* * * * *